INVENTORS
NOBUMASA OHOSHIMA
EIICHI SUGI

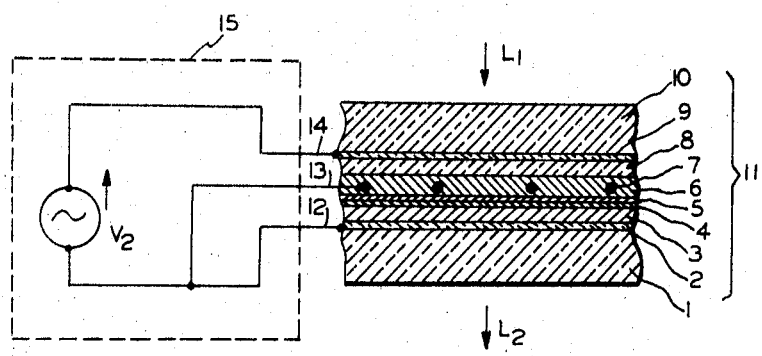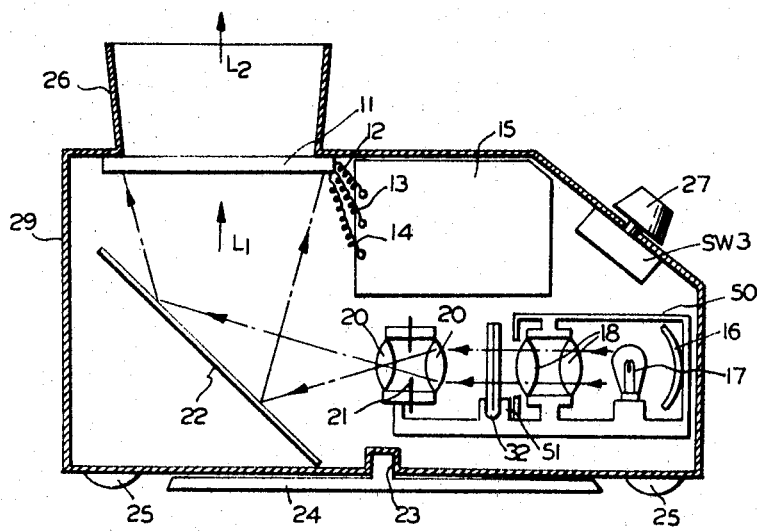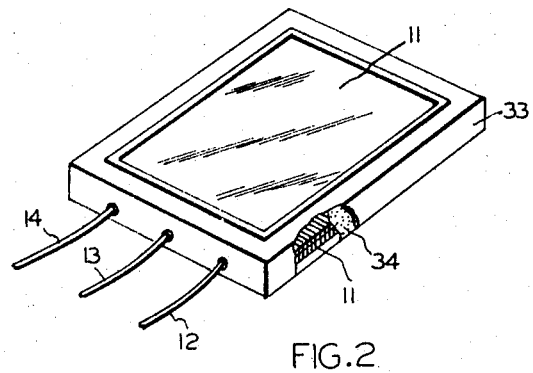

BY Wenderoth, Lind
& Ponack
ATTORNEYS

United States Patent Office 3,445,163
Patented May 20, 1969

3,445,163
REVERSIBLE FILM-VIEWING APPARATUS
Nobumasa Ohoshima, Hirakata-shi, Osaka-fu, and Eiichi Sugi, Moriguchi-shi, Osaka-fu, Japan, assignors to Matsushita Electric Industrial Co., Ltd., Osaka, Japan
Filed Nov. 7, 1966, Ser. No. 592,479
Claims priority, application Japan, Nov. 5, 1965, 40/68,660; Jan. 27, 1966, 41/5,074
Int. Cl. G03b 21/28
U.S. Cl. 353—77                                13 Claims This invention relates to a reversible film-viewing apparatus which converts a negative image of films into a positive image while reversely intensifying the image, and more particularly to reversible film-viewing apparatus comprising a solid state image converting panel formed of three principal integrated layers, an electroluminescent layer, a photoconductive layer and a transparent dielectric layer.

For convenience, said solid state image converting panel will hereinafter be referred to simply as an image converting panel throughout the specification and claims.

According to prior film enlarging techniques it has been difficult to select which negative film is suitable for printingv an enlarged positive photographic picture, because the negative image prevents an exact inspection of detailed pictures and face expression of the people in the films having a smaller size than that of 35 mm. film. In order to eliminate these disadvantages, this invention is to provide a reversible film-viewing apparatus having a simple construction.

An object of this invention is to provide a reversible film-viewing apparatus which converts a negative image of films into an enlarged positive image projected on an image converting panel.

A further object of this invention is to provide a reversible film-viewing apparatus in which the reproduced enlarged images are characterized by high brightness, high clarity and high resolution.

A further object of this invention is to provide a reversible film-viewing apparatus having a construction which is more easily operated so as to convert the negative image into the positive image and to control the contrast of the reproduced image.

Another object of this invention is to provide a reversible film-viewing apparatus which can be turnd easily in any direction for easy inspection of the images.

Theses and other objects will be apparent from the following description taken together with the accompanying drawings, wherein:

FIG. 1 is a cross sectional view of an image converting panel adapted for use in the reversible film-viewing apparatus in accordance with the invention;

FIG. 2 is a perspective view of image converting panel of FIG. 1 mounted in a frame;

FIG. 3 is a schematic diagram and a cross sectional view of a reversible film-viewing apparatus according to the invention;

Figure 4:
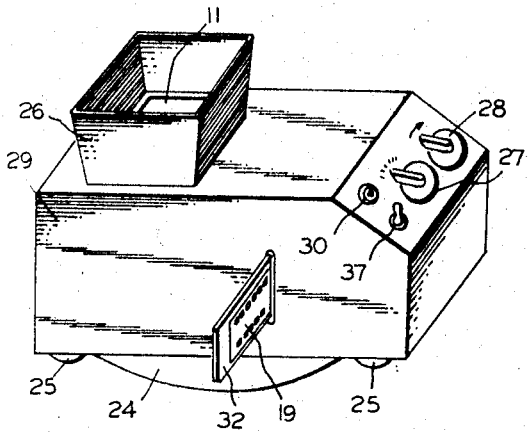
FIG. 4 is a perspective view of a reversible film-viewing apparatus defined in FIG. 3.

Before proceeding with a detailed description of the novel reversible film-viewing apparatus according to the invention, the image converting panel will be explained with reference to FIG. 1 of the drawings, wherein reference character 11 designates, as a whole, an image converting panel comprising, as its active elements, an electroluminescent layer 3, a photoconductive layer 6 and a transparent dielectric layer 8, said layers having great effects on the images in reversely intensified form on the surface of said image converting panel. Said electroluminescent layer 3 is superposed on a first transparent electrode 2 applied to a glass plate 1 and is followed by layers consisting of a reflective layer 4 and an opaque layer 5. Said photoconductive layer 6 has therein a parallel grid electrode 7 and is superposed on said opaque layer 5. Said tranrsparent dielectric layer 8 is positioned on said photoconductive layer 6 and is followed by a second transparent electrode 9 applied to a glass plate 10. Said first transparent electrode 2 and second transparent electrode 9 are connected to lead wires 12 and 14, respectively, so as to provide for the application of an AC voltage from voltage source $V_2$ across said two transparent electrodes. Said parallel grid electrode 7 is connected to a lead wire 13 so as to provide for making a short circuit or to provide for the application of an AC voltage from voltage source $V_1$, which is in reverse phase against $V_2$ and is connected to lead wire 12, across said parallel grid electrode 7 and said first transparent electrode 2.

The novel image converting panel can be prepared by painting techniques, such as spray and screen method, which are well known. Both transparent electrodes 2 and 9 can be tin oxide film chemically deposited on the glass plate 1 and 10 and having a thickness of from 3 to 5 mm. The tin oxide film can be covered by an electroluminescent paint to form the electroluminescent layer 3, the paint consisting of electroluminescent powder such as activated ZnS and binder such as urea resin in a solvent such a xylol or butanol. The operable thickness of said electroluminescent layer 3 is 30 to $40\mu$. The reflective layer 4 is prepared by applying, on said electroluminescent layer 3, a paint comprising $BaTiO_3$ powder having a particle size of from 2 to $8\mu$ and a binder such as urea resin in a solvent such a xylol or butanol. A paint comprising carbon black powder and a binder such as epoxy resin in a solvent such as butanol and methylethyl ketone is applied to said reflective layer 4 for forming said opaque layer 5, said opaque layer having a thickness of 10 to $15\mu$. Thin metal wires 7 are arranged parallel to each other in the photoconductive layer 6 superposed on said opaque layer 5, and are fixed at both ends. One end is connected to a copper electrode for electrical conduction to a lead wire 13. An example of metal wires which are operable is tungsten wires having a diameter of 5 to $15\mu$. The fixed metal wires are covered by a thin photoconductive layer so as to form the parallel grid electrode 7 embedded in the photoconductive layer 6, which is a mixture of photoconductive powder such as CdS or CdSe or a solid solution thereof and a binder such as epoxy resin in a solvent such as butanol and methyl-ethyl ketone, and this layer can be applied in a thickness of from 50 to 70μ by, for example, a silk screen method. The transparent dielectric layer 8 having a thickness of 25 to 80μ can be prepared by sandwiching a transparent thin film such as a polyester film between transparent dielectric adhesive material layers such as silicon rubber or silicon resin. To said transparent adhesive is adhered the second transparent electrode 9 which is a thin tin oxide film formed on the glass plate 10. It is important to cure the various binders and adhesive at a temperature lower than 150° C. because a higher curing temperature results in a severe impairement of the properties of the resultant image converting panel. The lead wires 12, 13 and 14 can be connected to the transparent electrodes 2 and 9 and the parallel grid electrode 7, respectively by using, for example, electrically conductive adhesive such as the silver paint named "Condyne" manufactured by Matsushita Electric Industrial Co., Ltd. Referring to FIG. 2, said image converting panel 11 is mounted in a plastic frame 33 with said lead wires 12, 13 and 14 extending out through the edge of said frame 33. The space between said image converting panel 11 and said frame 33 is filled with resin adhesive 34 or wax having a high resistance to humidity.

An explanation of reverse intensification of images projected on the image converting panel 11 will be made given with reference to FIG. 1.

A light input $L_1$ passing through the glass plate 10, the second transparent electrode 9 and the transparent dielectric layer 8 produces an impedance pattern in the photoconductive layer 6, with the impedance being less the more intense the light. The impedance pattern is divided into finely divided portion by the parallel grid electrods. When said first transparent electrode 2 and said parallel grid electrode 7 are short circuited and simultaneously the AC voltage $V_2$ is applied between said two transparent electrodes 2 and 9, the electric current at the portions having an extremely low impedance flows through the parallel grid electrode 7 into the lead wire 13 and the electric current at the portions having an extremely high impedance flows through the photoconductive layer 6, the opaque layer 5 and the reflective layer 4 into the electroluminescent layer 3. The portions having medium impedance are provided with electric current which flows into both the wire 13 and the electroluminescent layer 3. The ratio of electric current, at a given portion, i.e. that flowing into the electroluminescent layer 3 to that flowing into the lead wire 13, increases with an increase in the impedance. In such a way the electroluminescent layer 3 will produce an intensified negative of the image projected on the photoconductive layer 6, i.e. will produce an image in reversely intensified form. The opaque layer 5 prevents the photoconductive layer 6 from being influenced by the images reproduced on the electroluminescent layer 3. The dielectric break down voltage of said electroluminescent layer 3 can be improved by the provision of the reflective layer 4. The image reproduced in reversely intensified form on the electroluminescent layer 3 vary in brightness with the voltage and frequency of the applied AC voltage $V_2$ in addition to varying with the characteristics of the image converting panel. The contrast of reproduced images can be greatly improved by simultaneous application of said AC voltage $V_1$ which is in reverse phase with respect to each other.

Figure 6:
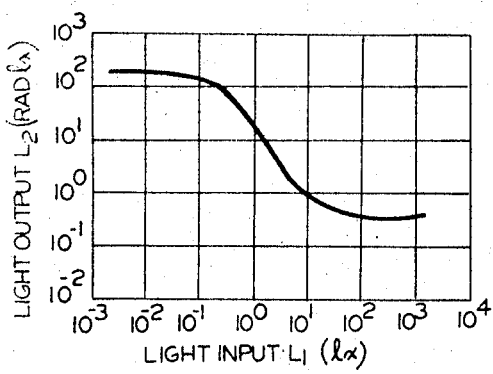
FIG. 6 is a graph illustrating the relation between the intensity of light input and light output for an image in reversely intensified form using the image converting panel.

Referring to FIG. 1 and FIG. 6, an AC voltage $V_2$ is applied across said lead wires 12 and 14 and said lead wires 12 and 13 are short circuited or are provided with an AC voltage $V_1$. An image projected as the light input $L_1$ on said photoconductive layer 6 through the glass plate 10, the transparent electrode 9 and the transparent dielectric layer 8 can be reproduced on the surface of said electroluminescent layer 3 and the light output $L_2$ is intensified when said lead wires 12 and 13 are in a short circuit connection and at the same time an AC voltage $V_2$ of 400 to 1800 volts at frequency of from 1 to 10 kc./sec. is applied across said lead wires 12 and 14. The reversely intensified image can be improved greatly by applying the voltage $V_2$ of 400 to 1800 volts at a frequency of 1 to 10 kc./sec. and at the same time applying a voltage $V_1$ of from 0 to 600 volts and in the opposite phase to the voltage $V_2$. The reversely intensified image can be improved in the brightness, resolution and clarity by the novel reversible film-viewing apparatus set forth hereinafter in accordance with the invention.

The whole constitution of reversible film-viewing apparatus according to this invention are a image converting panel which converts the negative image projected thereon into the intensified positive image, optical means provided for enlarging the images on original negative film and projecting the enlarged image on the surface of said image converting panel, controlling means of light intensity for projecting suitable light input to said image converting panel, a power source supplying necessary AC voltages $V_1$ and $V_2$ through lead wires 12, 13 and 14 to the image converting panel, contrast controlling means for reproduced images, and rotating means for positioning the apparatus at a desired location.

A reversible film-viewing apparatus according to the invention comprises aforesaid image converting panel, a light source having a light intensity controller, optical means receiving light from said light source and shining it through and enlarging images on a negative film and projecting the enlarged images on said image converting panel, film inserting means guiding a film through said optical means, a power source coupled to said panel and supplying AC voltages to said panel and a contrast controller for adjusting the tones of said reproduced images.

Referring to FIG. 3 and 4, reference character 11 is the image converting panel framed in a manner similar to that of FIG. 2 and 17 is a light bulb for use in light source, which is mounted in a light house 50. The light from said light bulb 17 is reflected by a light converging mirror 16 and is supplied to a condenser lens 18. A negative film 19 is held by a film holder 32 and is inserted into a guiding gap 51 which is positioned in front of said condenser lens 18. A radiation image of said negative film 19 is enlarged by a projecting lens 20 and is projected as a light input $L_1$ on the image converting panel 11 after reflected by a reflective mirror 22. A light intensity of the light input $L_1$ is controlled by an iris diaphragm 21. An image projected on the image converting panel 11 is controlled in the clarity by a focus control means 21. The necessary AC voltages $V_1$ and $V_2$ can be supplied to said image converting panel 11 through lead wires 12, 13 and 14 from a power source 15 which is mounted at an inside of a case 29. The circuit diagram of said power source 15 will be hereinafter explained.

In the novel reversible film-viewing apparatus outlined above, it is important that said image converting panel 11 be constructed so as to achieve a high brightness, high resolution, high response and entirely satisfactory tones of the reproduced images, and that said optical means has a construction which will promote the desirable characteristics of said image converting panel. In addition to these considerations, said power source 15 must have a construction which will permit simple and convenient operation for controlling the voltages $V_1$ and $V_2$.

The characteristics of reversed images produced by the apparatus according to the invention are strongly affected by aforesaid transparent dielectric layer 8. It is necessary that the dielectric strength be as high as possible, and the dissipation factor (tan δ) and the thickness be as low as possible. Reversed images which are superior in brightness and contrast can be obtained by a transparent dielectric layer 8 that is constructed of layer of transparent dielectric materials such as silicon resin or silicon rubber having sandwiched between them a transparent insulating film such as polyethylene-terephthalate film or polycarbonate film having a thickness of about 25μ. The overall thickness of such a transparent dielectric layer 8 is less than about 80μ and a thickness from 25 to 45μ can be entirely satisfactory with respect to the brightness and contrast of the reversed images and can provide a dielectric strength which give a satisfactory operational life to the image converting panel.

The resolution of reproduced pictures can be improved by controlling the particle size of aforesaid photoconductive powder such as CdS, CdSe or the solid solution of CdS in CdSe and of aforesaid electroluminescent powder such as ZnS, and by smoothly flattening each surface of the various layers of the image converting panel. In addition, the resolution can also be improved by a proper arrangement of the parallel grid electrode 7. It is preferable that parallel wires be as thin as possible and be spaced from each other a distance which is as small as possible. The particle size of the electroluminescent powder and the photoconductive powder should be less than 10μ and a preferred average particle size is from 5 to 8μ. The parallel grid electrode 7 can be made from tunsgten wires about 5 to 15μ in diameter and spaced at distance of from 300 to 600μ from each other. In such a way reproduced pictures can be provided with a resolution as high as 10 to 20 line pairs per mm.

Figure 5:
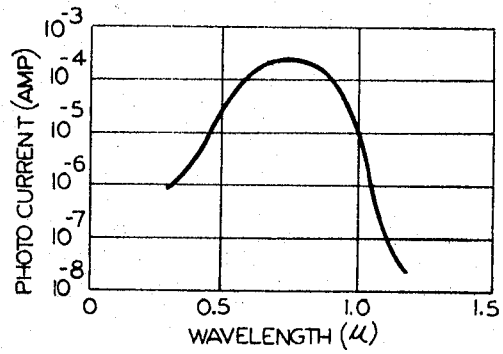
FIG. 5 is a graph illustrating the spectral response of photoconductive CdS.

When the photoconductive material used for the novel image converting panel is CdS or its modifications having a satisfactory photosensitivity and response time, the reproduced images has characteristic sensitivity which is dependent upon the photosensitivity of photoconductive materials. Conventional photoconductive materials such as CdS and its modification has an effective spectral response ranging from 0.4 to 1.1μ as shown in FIG. 5.

Therefore, it is preferable to use various components of said optical means those which do not cut off the effective wave length of photoconductive CdS, and do cut the wave length higher than 1.1μ for protecting the film from over heating. Commercially available project lens and condenser lens will be able to transmit the light of necessary wave lengths, whereas a heat-arresting filter glass and a part of the condenser lens are apt to have a narrow range of transmission of light.

Superior intensifying action of the image converting panel according to the invention can reproduce satisfactorily images even when the light intensity is low. Therefore the apparatus according to the invention is not necessary to employ a light bulb having a high power which results in over heating of the film and the apparatus can eliminate the heat-arresting filter. A wide-angle lens for use in the project lens 20 is preferable for miniaturizing the apparatus and reducing necessary light intensity of light source. A super wide-angle lens having a focusing distance shorter than 25 mm. is apt to have nonuniformity of light transmission over all the lens and is not suitable for this apparatus. Since the reproduced pictures are intensified and emphasized in the nonuniformity of pictures projected on the image converting panel, it is necessary for producing satisfactory pictures that the project lens 20 be superior in resolution and uniformity of light transmission over all the lens and have suitable short focus. A good projecting lens 20 is, for example, a lens which has a characteristic F:4 aperture and F:35 mm. focus, such as is manufactured by Minolta Camera Corporation of Japan under the name of "W-ROKKOR-Qe lens."

Other optical means according to the invention can be incorporated in the novel reversible-film-viewing apparatus in a way similar to that in which it is used in prior film-slide projecting apparatus which is, for example, manufactured by Minolta Camera Corporation under the name of "Minolta Mini-35-Projector" comprising a light converging mirror, a light bulb (100 v.–75 v. projection lamp; Fuji Electric Lamp Industrial Co., Ltd.), a condenser without heat-arresting glass and a reflective mirror.

Figure 7:
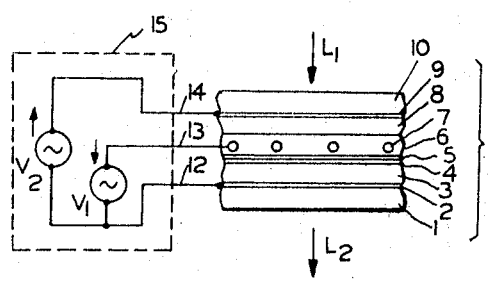
FIG. 7 is a circuit diagram showing a contrast controller system for reproduced images coupled to the image converting panel, which is shown in cross section.

The magnitude of intensification of the reproduced pictures on said image converting panel depends upon the light input $L_1$, as shown in FIG. 7. The intensified picture has light output $L_2$ which is much higher than the light input $L_1$ when the light input is in a critical range which varries slightly with the thickness of the component layers, and constitution, materials of the image converting panel and with supplying the voltages $V_1$ and $V_2$ to the image converting panel.

Figure 9:
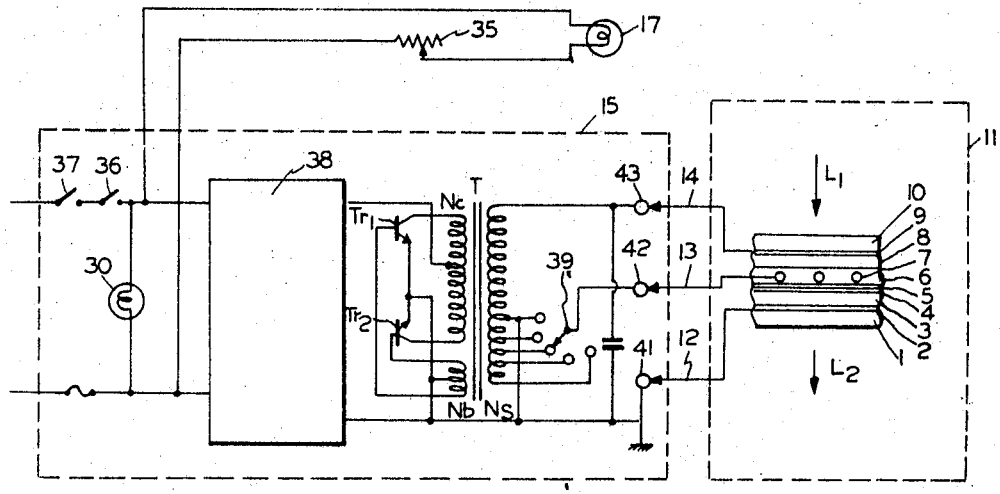
FIG. 9 is a circuit diagram of a power supply means connected to the image convering panel.

Therefore, it is necessary, in order to produce sufficiently intensified pictures to control the intensity of light input. The intensity of light input depends upon the tone of original films as well as the characteristics of the image converting panel. The light input can be controlled by a light intensity controller which controls the electric current flowing through the light bulb 17 with a variable resistor 35 (i.e. 0–200Ω 25 w.) as shown in FIG. 9 or by a control means in the form of an iris diaphragm 21 or combination thereof. A preferable method for controlling the light input is to employ so-called electric eye device such as that used with a photographic camera. Said electric eye device comprises a photoconductive element for measuring the intensity of light input and an automatic diaphragm controller coupled to the photoconductive element, and can facilitate continuous production of a suitable light input $L_1$ regardless of the tones of the film.

Figure 8:
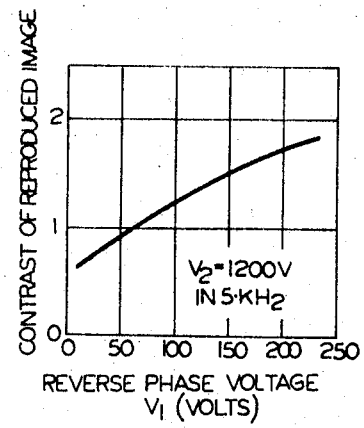
FIG. 8 is a graph illustrating the contrast of images reproduced in reversely intensified form on the image converting panel as a function of the AC voltage $V_1$ applied across the first transparent electrode and a parallel grid electrode of the image converting panel when the AC voltage $V_2$ is constant.

The contrast of the reproduced pictures is defined by a slope of the curve of light input vs. output shown in FIG. 6 and depends upon the voltage $V_1$ across a first transparent electrode 2 and a parallel grid electrode 7, said voltage $V_1$ having a phase opposite to that of the voltage $V_2$ which is supplied between two transparent electrodes 2 and 9 as shown in FIG. 7. FIG. 8 shows an example of variation in the contrast for reverse intensification when $V_2$ is 1200 v. and 5 kc./sec.

The power source 15 for the image panel can be any power source which is able to supply two voltages with a phase and frequency suitable for giving the necessary characteristics, for example, electrical properties, brightness and life, to the image converting panel of the invention. Referring again to FIG. 7, the reverse intensification can be produced by applying an AC voltage $V_2$ across the two transparent electrodes 2 and 9 and by short circuiting the first transparent electrode 2 and the parallel grid electrode 7. An improved contrast of reversely intensified pictures can be obtained by applying across the transparent electrode 2 and the parallel grid electrode 7 an AC voltage $V_1$ having phase opposite of that of the AC voltage $V_2$. The frequency and size of voltage $V_1$ and $V_2$ depend upon the characteristics of the image converting panel, especially upon the dielectric properties thereof. It is necessary in order to hold a definite brightness of the reproduced pictures that the lower frequency be used with a higher voltage, because variation in the brightness is proportional to both the frequency and voltage supplied to the electroluminescent layer. The low voltage increases the life of the image converting panel but impairs the clarity and the brightness of the reproduced pictures. A high voltage improves the brightness but reduces the life of the image converting panel due to a dielectric breakdown. Therefore, it is necessary to select a frequency and size for voltages $V_1$ and $V_2$ to balance the brightness and the life that is required. Example of specific voltages which will give reproduced pictures of superior quality on the image converting panel having the construction described above are as follows: for reverse intensification, $V_2$ is 1800 v. and 1 kc./sec. or 1200 v. and 5 kc./sec. and the $V_1$ is 0, i.e. electrodes 2 and 7 are short circuited or is up to 600 v. and has a phase opposite to that of $V_2$.

A conventional power source is apt to be rather large in size when it is required to supply two AC voltages at a high apparent power at the same time. The large size is not desirable for miniaturizing the reversible film-viewing apparatus. A miniaturized power source suitable for the reversible film-viewing apparatus in accordance with the invention is shown in FIG. 9.

The novel power source according to the invention comprises an all transistorized self-oscillator system which utilizes various interelectrode capacitances of the image converting panel as a part of the tuning capacitance thereof. In the self-oscillator system, a secondary coil of an output transformer forms a tuning circuit which uses the interelectrode capacitance of the image converting panel as part of the tuning capacitance. The self-oscillator system can reduce the amount of electric power needed by compensating for the apparent power needed for operating the image converting panel, and consequently can make it possible to reproduce stable pictures on the image converting panel. The novel power source comprising the self-oscillator system can be constructed so that it has a size less than one several tenth of conventional power source and can easily facilitate reversely intensifying as well as adjusting of the contrast of reproduced pictures by the operating of only switch attached thereto.

Referring to FIG. 9, reference characters $Tr_1$ and $Tr_2$ are transistors for oscillating, and are in a push-pull type of connection. A collector winding Nc, a base winding Nb and a secondary winding Ns are provided for an output transformer T. The bases of said transistors are connected to the opposite ends of base winding Nb, the collectors are connected to the opposite ends of collector winding Nc, and the emitters are connected directly to each other. Said transistors $Tr_1$ and $Tr_2$ and said output transformer T form a self-oscillator which is connected to a conventional DC stabilized power source 38 by taps from the middle portions of winding Nc and Nb. The voltage $V_1$ and $V_2$ according to this invention are supplied to the image converting panel 11 through terminals 41, 42 and 43 having the lead wires 12, 13 and 14 connected thereto, respectively. The terminals 41 and 43 are connected to one end of secondary coil Ns and a tap therefrom, respectively, while the terminal 42 is connected to rotary switch 39.

A rotary switch 39 can be moved to contact any one of several taps from coil Ns to supply any one of several voltage of the opposite phase as the voltage between the first transparent electrode 2 and the parallel grid electrode 7 to said image converting panel for improving the contrast of reproduced pictures.

The aforesaid electrodes of the image converting panel can be supplied with voltages suitable for reproducing pictures by providing an appropriate number of turns for said windings Nc, Nb and Ns and positioning the taps of the windings appropriately depending on the interelectrode capacitances. In such a way the desired contrast of reproduced pictures can be controlled by said rotary switch 39 without changing the brightness.

Figure 10:
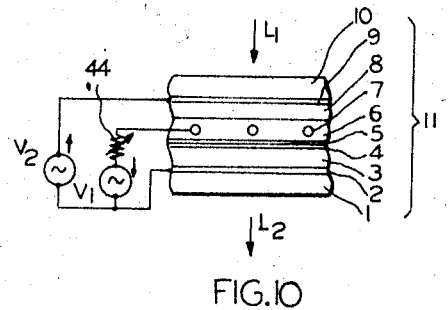
FIG. 10 is a circuit diagram showing a contrast controller system for reproduced images coupled to the image converting panel, which is shown in cross section.
Figure 11:
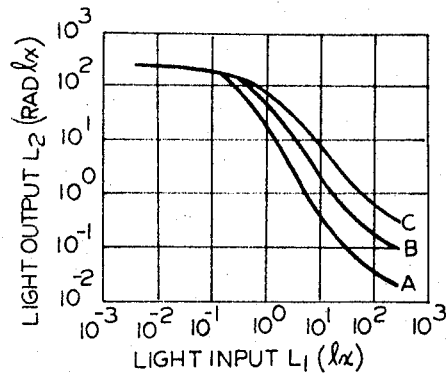
FIG. 11 is a graph illustrating light output relative to light input as a function of the electric resistance of the variable resistor used as a contrast controller in the circuit shown in FIG. 10.

The contrast of the reproduced pictures can also be improved by a contrast controller comprising variable resistor. Referring to FIG. 10, variable resistor 44 having a resistance range from 0 to 10KΩ are connected between the first transparent electrode 2 and the parallel grid electrode 7. It will be obvious from FIG. 11 that an increase in the resistance of said resistor 44 makes the light input vs. light output curve shift upwards from a curve A through a curve B to a curve C which is the lowest contrast of the reversely intensified picture as among the curve A, B and C. The fine adjustment of the contrast can be effected by said variable resistor 44 in association with aforesaid method by a voltage selector switch such as the switch 39 and an appropriate voltage source.

Referring again to FIG. 9, a main switch 37 is connected through a micro switch 36 (i.e. catalogue No. AM-1503; Matsushita Electric Works Ltd.) between said conventional DC stabilized power source 38 included in the power source 15 and commercial AC source. Said micro switch 36 can be automatically switched on so as to facilitate automatically supplying the voltages to the image converting panel 11 and to the lamp 17 of light source when the film holder 32 having a series of negative films 19 are inserted into aforesaid guiding hole 51.

A reversible film-viewing apparatus according to the invention can be constructed in a miniature size and be transistorized device which is operated promptly as soon as the main switch 37 or micro switch 36 is turned on. There is no need for the transistorized device to have a period of time necessary for warming up conventional components using of vacuum tube and the operation life of the novel image converting panel can be prolonged.

A specified embodiment of the invention will be described with reference to FIG. 3 and FIG. 4 and should not be constructed as limitative. The image converting panel 11 having a construction shown in FIG. 2 is mounted in the top face of the novel apparatus and is provided with a light hood 26 for preventing undesirable external light from falling on the panel. A power source 15 having a construction described above is mounted in the apparatus and is connected to lead wires 12, 13 and 14 of the image converting panel 11 in the way described above. The micro switch 36 is constructed in such a way that the micro switch automatically actuates operation of the power source and the light source as soon as the film holder 32 is inserted into the guiding hole 51. Then, original negative films 19 can be successively inspected as enlarged positive pictures. An indicating lamp 30 in the front face shows the operation of said power source 15.

A rotary switch 39 operates with turning a knob 27 and controls the contrast of reproduced picture in a manner described precedingly with respect to the power source 15. A variable resistor 35 is operated by a knob 28 and controls the light intensity of lamp 17 for the light input projected on the image converting panel.

A roll of negative film is cut to a sheet containing several pictures of different directions from each other after developed, and is held by the film holder 32. The different directions make it impossible to inspect the reproduced pictures from one viewing direction. Therefore, it is desirable to rotate the reversible film-viewing apparatus in accordance with the direction of the pictures so as to have a look of a proper direction from the predetermined position. Referring again to FIG. 3, the apparatus according to the invention is provided with revolving balls 25 at the corners of the bottom thereof so that the apparatus can be rotated in accordance with the direction of the reproduced pictures. The apparatus is joined with a stand 24 at the bottom so as to prevent the apparatus from moving away when it is rotated by revolving balls 25. The stand 24 has a projection at the center and is joined with a cavity 23 of the apparatus so as to facilitate free rotating of the apparatus.

What we claim is:

1. A reversible film-viewing apparatus capable of reversely intensifying images of negative films, which comprises an image converting panel consisting of a glass plate, a first transparent electrode on said glass plate, an electroluminescent layer having an electroluminescent material on said first transparent electrode, a reflective layer on said electroluminescent layer, an opaque layer on said reflective layer, a photoconductive layer containing photoconductive material on said opaque layer, a parallel grid electrode embedded in said photoconductive layer. a transparent dielectric layer having a transparent film thereon on said photoconductive layer, second transparent electrode on said dielectric layer and a second glass plate; a light source having a light intensity controller; and optical means receiving light from said light source and shining it through and enlarging images on a negative film and projecting the enlarged images on said photoconductive layer of said panel through the second transparent electrode and the transparent dielectric layer layer of said image converting panel, said optical means having projecting lens and condenser lens which pass all effective light wave-lengths of the spectral response characteristic of said photoconductive material; film inserting means guiding a film through said optical means; a power source coupled to said panel and supplying AC voltages across said two transparent electrodes and across said first transparent electrode and said parallel grid electrode so as to reproduce images on said electroluminescent layer; and a contrast controller in said power source for adjusting the tones of said reproduced images.

2. A reversible film-viewing apparatus as claimed in claim 1, in which said reflective layer contains barium titanate powder.

3. A reversible film-viewing apparatus as claimed in claim 1, in which said opaque layer has carbon powder therein.

4. A reversible film-viewing apparatus as claimed in claim 1, in which said photoconductive material consists of photoconductive CdS and has a spectral response having effective wave-lengths of 0.4 to $1.1\mu$.

5. A reversible film-viewing apparatus as claimed in claim 1, wherein said parallel grid electrode is a set of parallel tungsten wires spaced from each other a distance of from 300 to $600\mu$, said tungsten wires having a diameter of from about 5 to $15\mu$.

6. A reversible film-viewing apparatus as claimed in claim 1, wherein said transparent dielectric layer consists of transparent organic silicon polymer.

7. A reversible film-viewing apparatus as claimed in claim 6, wherein said transparent dielectric layer has a thickness less than $80\mu$ and consists of a transparent dielectric film selected from the group consisting of a polyethylene terephthalate film and a polycarbonate film, and a transparent dielectric material selected from the group consisting of silicon rubber and silicon resin which said transparent dielectric film is sandwiched.

8. A reversible film-viewing apparatus as claimed in claim 1, wherein said optical means comprises a condenser lens without heat-arresting treatment and a project lens of a wide-angle lens with an iris diaphragm control means, and pass all effective light wave-length from 0.4 to $1.1\mu$ of the spectral response characteristic of said photoconductive CdS in said image converting panel.

9. A reversible film-viewing apparatus as claimed in claim 1, wherein said power source is a self-oscillator circuit which is coupled to said panel for utilizing the interelectrode capacitance of said image converting panel as a part of the tuning capacitance for oscillation.

10. A reversible film-viewing apparatus as claimed in claim 9, wherein said self-oscillator circuit comprises a secondary winding of an output transformer, said secondary winding having taps which are connected to said two transparent electrodes and through a voltage selector switch to said parallel grid electrode of said image converting panel simultaneously with two AC voltages $V_1$ and $V_2$, said voltage $V_1$ being applied across said first transparent electrode and said parallel grid electrode, said voltage $V_2$ being applied across said first transparent electrode and second transparent electrode.

11. A reversible film-viewing appaartus as claimed in claim 9, wherein said power source comprises a stabilized DC power source, an output transformer having a collector winding, a base winding and a secondary winding, first and second transistors having the bases thereof connected to the ends of said base winding, the collectors thereof connected to the ends of the collector winding, and the emitters thereof connected to each other in push-pull configuration, the middle portions of said base winding and collector winding having taps connected to said DC source, one end of said secondary coil connected to said second transparent electrode of said panel, taps therefrom, respectively, connected to said parallel grid electrode of said panel through said voltage selecting switch, and a connection from said DC power source directly connected to said first transparent electrode and a tap of middle portion of said secondary coil.

12. A reversible film-viewing apparatus as claimed in claim 1, wherein said power source has a micro switch which facilitates automatically supplying the voltages to the image converting panel and to the light source only when the negative film held by a film holder is inserted into a guiding hole.

13. A reversible film-viewing apparatus as claimed in claim 1, which comprises additionally rotating means at corners of the bottom of the apparatus for providing a look of a reproduced picture in a proper direction.

References Cited

UNITED STATES PATENTS 3,306,160   2/1967   Dinhobel et al. _____ 88—24

NORTON ANSHER, *Primary Examiner.*

R. A. WINTERCORN, *Assistant Examiner.*

U.S. Cl. X.R.

355—11